United States Patent Office 3,304,837
Patented Feb. 21, 1967

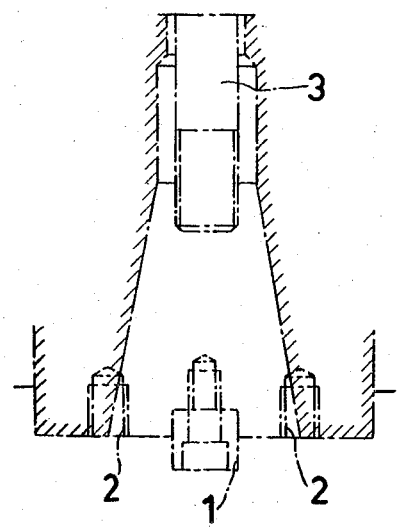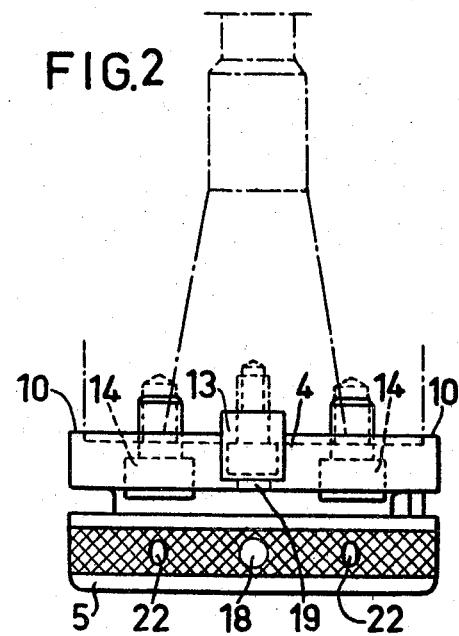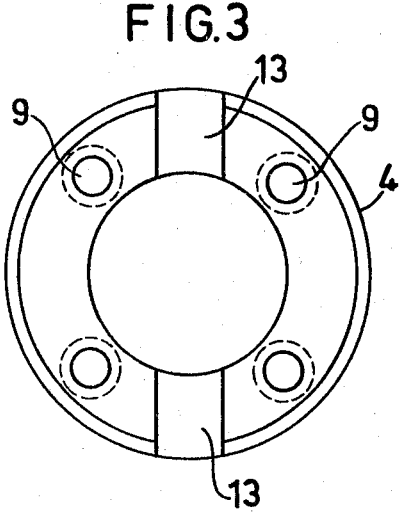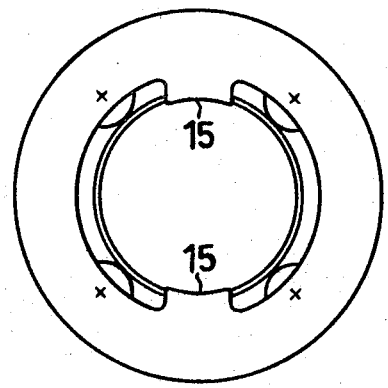

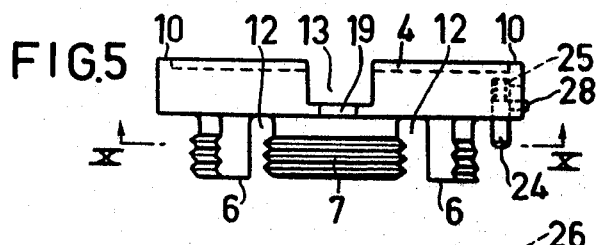
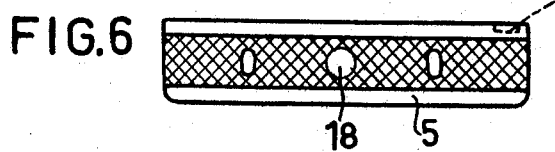
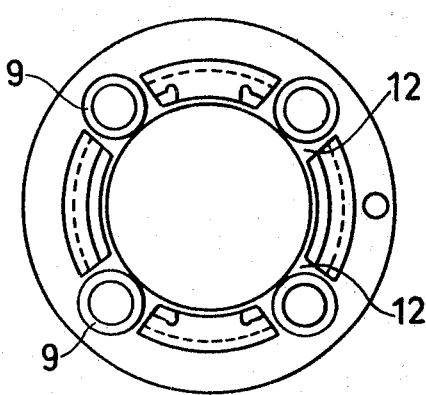
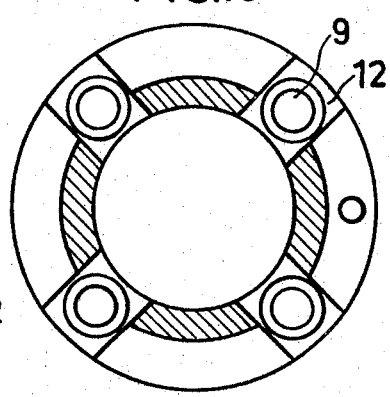
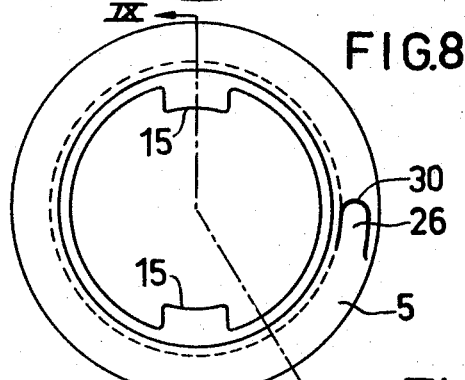
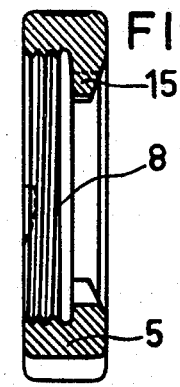

3,304,837
MEANS FOR QUICKLY CHANGING TOOLS IN MACHINE SPINDLES
Gustav Einar Perman, Furugatan 4, Eskilstuna, Sweden
Filed Dec. 7, 1964, Ser. No. 416,394
Claims priority, application Sweden, Dec. 13, 1963, 13,922/63
2 Claims. (Cl. 90—11)

In some machines, for instance boring mills and milling machines having a rotary spindle tools are secured by means of chucks or the like in a conical hole. Also some tools, such as horizontal milling cutters, are secured by means of screws to the very end surface of the spindle which has corresponding threaded holes. Usually the spindle is also bored axially to receive a pulling rod, by which the tool, the tool fixture or the chuck is tightened against the taper shank of the spindle.

In bigger machines, particularly those of the vertical type, it is however rather time-consuming to change tools. It is difficult to hold the tool, for instance a cutter, and at the same time tighten or loosen the pulling rod. In late years, since program controlled machines have come into use, attention has been paid to this problem of quickly changing tools. Different types of tools are used for different operations and consequently the tools must be changed rather often. One has endeavoured to get rid of the pulling rod as locking device and to obtain a manageable device at the spindle end to gain time. A collet has therefore been made in the spindle cone, for instance with a locking ring with balls.

This invention relates to a still more uncomplicated device for quick exchange of tools in such machine spindles and, shortly expressed, consists substantially of two rings, one of which, the so-called nose ring, is adapted to be secured to the end surface of the spindle and has itself on the underside in a central neck an external thread for a corresponding internal thread in the other ring, the so-called locking ring, the latter internally also having one or more projections adapted to exchangeably engage a peripheral groove in the shank of the tool, tool fixture or chuck to be locked, in order to press the taper shank of the tool et cetera against the spindle cone when the locking ring is screwed onto the nose ring, and vice versa in order to loosen the tool from the spindle cone, when the locking ring is unscrewed from the nose ring.

As for the details of the device reference is had to the following description and the accompanying drawings which illustrate the invention by way of a suitable embodiment.

FIG. 1 indicates the lower portion of a miller spindle. This miller is at its lower end furnished with two diametrically opposed driving lugs or wedges, one of which, designated by 1, appears in the figure. The reference numeral 2 designates screw holes in the spindle end and 3 the central pulling rod extending down into the conical cavity, as already mentioned in the introduction. It might be added that this design of the spindle is international standard.

FIGURES 2 to 13 illustrate a practical embodiment of the invention.

FIGURE 2 illustrates a side view of the device, FIGURES 3 and 4 the device seen from above and from below respectively.

FIGURES 5 and 6 are side views of the two rings screwed apart. The upper ring is shown from below in FIGURE 7 and the lower ring from above in FIGURE 8. FIGURE 8a illustrates a detail.

FIGURE 9 shows a section IX—IX in FIGURE 8 and FIGURE 10 a section X—X in FIGURE 5.

Figure 11:
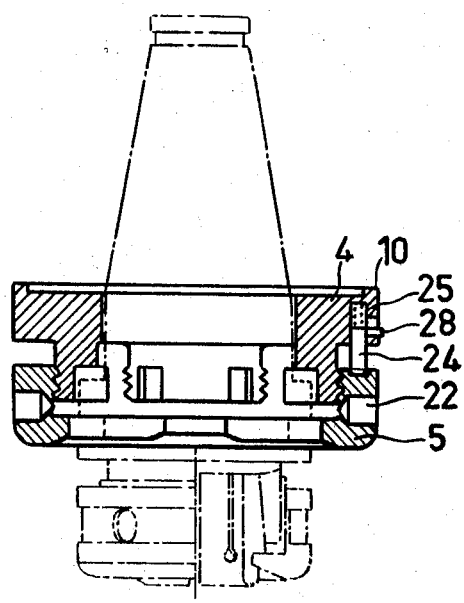
Figure 12:
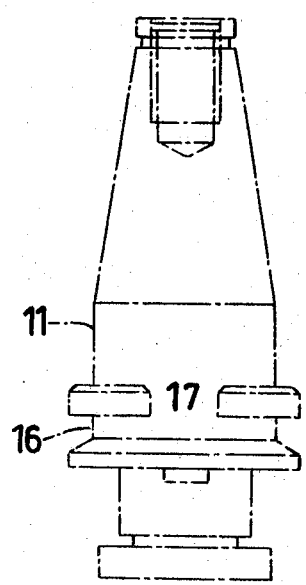
Figure 13:
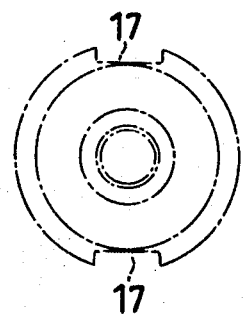

FIGURE 11 illustrates a diametrical section of the two rings together with a chuck located in them in un-locked position. FIGURES 12 and 13 show an end mill mandrel from the side and from above respectively.

The above mentioned nose ring is designated by 4 and the locking ring by 5. The nose ring has a neck 6 on the underside externally provided with a thread 7. A thread 8 in the ring 5 corresponds to the thread 7. Smooth screw holes 9 in the nose ring, for which the neck 6 has been cut through at 12 in a way shown in FIGURES 5 and 10, correspond to the screw holes of the machine spindle. Thus, the neck constitutes projections 6 positioned in a circle concentric with the rings 4 and 5. Furthermore, the nose ring has two recesses 13 on the upper side for corresponding driving lugs 1 of the spindle. In many cases it is however sufficient with one lug and corresponding recess. The same driving effect can of course be attained, if the nose ring is provided with a lug and the corresponding recess is made in the spindle, but the device should preferably be adapted to the standard type. In FIGURE 2 it is partly indicated in dot and dash lines, how the ring is fixed to the spindle end by means of screw bolts 14.

By the two threads 7 and 8 the locking ring 5 can be screwed toward and away from the nose ring. The locking ring can be brought into engagement with the tool or tool fixture to be secured in the spindle, and this engagement is obtained by projections engaging a groove in the shank of the tool. As shown in the drawing the projections are located in the locking ring and a corresponding groove is made in the shank of the tool et cetera, but they may alternatively be placed in the opposite manner. The projections are designated by 15 (FIGURE 8) and the groove by 16 (FIGURE 12). The annular groove 16 is preferably made by turning. The upper groove wall or flange is provided with gaps 17 for receiving the respective projection 15.

The device is used in the following way:

The nose ring 4 is screwed on to the end surface of the spindle, a flange 10 closely engaging the spindle end and contributing to centering and retaining the nose ring without rendering the diameter of the nose ring substantially greater than that of the spindle. The locking ring is now screwed on to the nose ring so that the threads 7 and 8 engage each other. When a mark 18 on the locking ring is set opposite to a mark 19 on the nose ring, this means that the locking ring assumes zero position, i.e., the initial position in which the tool or the tools fixture is inserted in or removed from the spindle. As the projections 15 are located in the same vertical plane as the mark 18, it is, at the insertion, possible to easily set the apertures 17 opposite the projections 15 so that the tool, for instance the mandrel 11 in FIGURE 12, can be pushed up high enough in order to make it possible to turn the projections 15 into the groove 16.

Thereafter the mandrel et cetera is locked by screwing home the locking ring, for instance by means of a pin (FIGURE 8a), which is inserted in one of the holes 22 in the locking ring. In order to still more facilitate the tightening, the locking ring may be provided with grip means, such as a hand wheel (not illustrated) having a ring concentric with the spindle and the locking ring. Besides the hand wheel must also be designed in such a manner that it does not involve any risk for the operator during the rotation of the spindle.

In order to make it easy to set the locking ring at zero, i.e. initial position, a pin 24 is inserted in the nose ring in a position parallel to the rotary shaft, said pin being actuated by a spring 25 pressing the lower end of the pin down to a curved groove 26, in the locking ring concentrically with the rotary shaft. If the locking ring is turned in the direction away from the locking position, an end wall 30 in the groove strikes against the pin and the locking ring assumes its initial position. In the opposite direction the bottom of the groove runs up to the surface, and therefore the pin in that direction does not limit the rotary motion. The pin 24 may be moved out from the groove 26 by means of a lateral pin 28, if necessary.

If two projections 15 are used, the rotation of the locking ring will be 180° before the projections 15 leave the groove 16; if only one projection and only one gap 17 are used, the rotation will be 360°. In the former case hardly the half pitch is utilized, in the latter case almost the whole one. If three projections 15 are used, i.e. an additional one between two other, diameterically located grooves, and corresponding gap 17, thus a division=90°, 90° and 180°, almost also the whole pitch may be utilized and at the same time the tool et cetera may at the locking be exposed to a pressure at three points, the pressure being more distributed in this way.

The indicating device exemplified by the pin 24 may be replaced by an other device and also be varied so that the pin is located in the locking ring and the groove in the nose ring.

An advantage of this locking device is that the tool fixture enters direct into the spindle by the shank, the best centering being thereby obtained. If the tool fixture is made as an ordinary chuck, the latter is chiefly used for variation of the tools to be secured in the spindle and is not exchanged until it is insufficient for the tool to be used.

It need hardly be added that the device according to this invention may be used also in horizontally placed machine spindles.

What I claim is:

1. A device for the rapid change of a tool on a machine spindle, said spindle having a tapered central cavity, an annular end surface, screw holes in said end surface and at least one laterally extending lug and said tool having a tapered end portion and a shank portion having an annular flange and a groove below said flange and a gap in said flange opening to said groove, said device comprising a nose ring having screw holes adapted to be alined with said screw holes in said end surface and at least one internal recess adapted to receive said lug, said nose ring having also a ring of depending externally threaded projections between said screw holes therein, the threads on said projections being arranged in a circle of smaller diameter than said ring, an internally threaded locking ring adapted to be screwed on to said ring of externally threaded projections on said nose ring, said locking ring having at least one inwardly extending projection adapted to pass through said gap in said flange on said tool shank and to engage in said annular groove and external markings on said nose ring and said locking ring for indicating when said locking ring is in its initial position.

2. A device as defined in claim 1 comprising means for determining the inital position of sad locking ring, said means comprising a bore in one of said rings, said bore extending to and perpendicular to the face of said one ring adjacent to a face of the other ring, a pin slidably mounted in said bore, a spring in said bore tensioned to move said pin toward said other ring and an arcuate groove in said face of said other ring adapted to receive the end of said pin, said groove gradually deepening from one end thereof coincident with said face to a stop surface at the other end thereof.

References Cited by the Examiner

UNITED STATES PATENTS 2,474,675  6/1949  Jankowski.

FOREIGN PATENTS 600,537  6/1960  Canada.

WILLIAM W. DYER, JR., *Primary Examiner.*

LEONIDAS VLACHOS, *Examiner.*